US008365234B2

(12) United States Patent
Coles et al.

(10) Patent No.: US 8,365,234 B2
(45) Date of Patent: Jan. 29, 2013

(54) METHOD AND ARRANGEMENT FOR STORING AND PLAYING BACK TV PROGRAMS

(75) Inventors: Christopher B. Coles, Littleton, CO (US); Christoph Hielscher, München (DE); Stefan Jenzowsky, Gräfelfing (DE); Axel Scheuer, München (DE); Harald Schweickhardt, München (DE); Rudolf Stelzl, Dachau (DE)

(73) Assignee: Nokia Siemens Networks GmbH & Co. KG, Munich (DE)

( * ) Notice: Subject to any disclaimer, the term of this patent is extended or adjusted under 35 U.S.C. 154(b) by 1099 days.

(21) Appl. No.: 11/910,444

(22) PCT Filed: Mar. 28, 2006
(Under 37 CFR 1.47)

(86) PCT No.: PCT/EP2006/061080
§ 371 (c)(1),
(2), (4) Date: Apr. 22, 2008

(87) PCT Pub. No.: WO2006/103224
PCT Pub. Date: Oct. 5, 2006

(65) Prior Publication Data
US 2009/0041433 A1    Feb. 12, 2009

Related U.S. Application Data

(63) Continuation of application No. PCT/EP2006/061080, filed on Mar. 28, 2006.

(60) Provisional application No. 60/666,392, filed on Mar. 30, 2005.

(51) Int. Cl.
*H04N 7/173* (2006.01)

(52) U.S. Cl. .......................................... 725/88; 725/22

(58) Field of Classification Search .................. None
See application file for complete search history.

(56) References Cited

U.S. PATENT DOCUMENTS 5,790,935 A    8/1998    Payton
5,999,689 A  * 12/1999    Iggulden .................. 386/248
(Continued)

FOREIGN PATENT DOCUMENTS
AU    2003260525 A1    10/2003
(Continued)

OTHER PUBLICATIONS

Yi-Hung Wu et al.: Enabling Personalized Recommendations on the Web based on User Interest and Behaviors, Research Issues in Data Engineering, 2001. Proceedings. Eleventh International Workshop on Apr. 1-2, 2001, Piscataway, NJ, USA, IEEE, Apr. 1, 2001, pp. 17-24, XP010538597.
(Continued)

*Primary Examiner* — Brian Pendleton
*Assistant Examiner* — Cai Chen
(74) *Attorney, Agent, or Firm* — Michael Haynes PLC; Michael N. Haynes

(57) ABSTRACT

The invention relates to a method and arrangement (100) for storing and playing back TV programs, in particular to the improved method and device (100) for operating a PVR, in particular a network PVR (102). The inventive device for storing and playing back the TV programs comprises means for selecting a storable TV program, means (102, 108) for recording a TV program and means (104, 102, 108) for playing back, in a time delayed manner, said recording during a recordable TV program. Said arrangement also comprises means for determining the beginning time of transmission of the recordable TV program and means for determining the total advertising duration which passes on the screen during the TV program transmission. Said invention makes it possible to determine, as soon as possible, a time to start an advertising-free playing back according to the beginning of transmission, the total duration of the advertising and to advise a user thereabout.

12 Claims, 1 Drawing Sheet

U.S. PATENT DOCUMENTS

| | | | |
|---|---|---|---|
| 6,725,460 B1 * | 4/2004 | Nishiyama et al. | 725/32 |
| 6,901,603 B2 | 5/2005 | Zeidler | |
| 6,968,364 B1 | 11/2005 | Wong | |
| 7,356,246 B1 | 4/2008 | Kobb | |
| 7,673,315 B1 | 3/2010 | Wong et al. | |
| 2002/0025777 A1 | 2/2002 | Kawamata | |
| 2002/0083440 A1 * | 6/2002 | Dupuis et al. | 725/32 |
| 2002/0095510 A1 | 7/2002 | Sie | |
| 2002/0174433 A1 | 11/2002 | Baumgartner et al. | |
| 2003/0012554 A1 | 1/2003 | Zeidler | |
| 2003/0039465 A1 | 2/2003 | Bjorgan | |
| 2003/0093792 A1 | 5/2003 | Labeeb | |
| 2003/0122966 A1 * | 7/2003 | Markman et al. | 348/563 |
| 2003/0135539 A1 | 7/2003 | Kondo | |
| 2003/0188320 A1 | 10/2003 | Shing | |
| 2003/0208763 A1 | 11/2003 | McElhatten et al. | |
| 2003/0223733 A1 | 12/2003 | Chang | |
| 2004/0003398 A1 | 1/2004 | Donian | |
| 2004/0068739 A1 | 4/2004 | Russ | |
| 2004/0078829 A1 | 4/2004 | Patel et al. | |
| 2004/0154040 A1 | 8/2004 | Ellis | |
| 2004/0228605 A1 | 11/2004 | Quan et al. | |
| 2005/0002639 A1 | 1/2005 | Putterman | |
| 2005/0002640 A1 | 1/2005 | Putterman | |
| 2005/0055713 A1 | 3/2005 | Lee | |
| 2005/0183120 A1 | 8/2005 | Iyer | |
| 2006/0010467 A1 | 1/2006 | Segel | |
| 2006/0059260 A1 | 3/2006 | Kelly | |

FOREIGN PATENT DOCUMENTS

| | | |
|---|---|---|
| AU | 2003219435 A1 | 12/2003 |
| CN | 1457460 A | 11/2003 |
| CN | 1482807 | 3/2004 |
| CN | 1595961 A | 3/2005 |
| CN | 1656805 A | 8/2005 |
| CN | 1656812 A | 8/2005 |
| EP | 0993142 | 4/2000 |
| EP | 1491054 A1 | 12/2004 |
| EP | 1515549 A | 3/2005 |
| JP | 2005039657 | 2/2005 |
| JP | 2005086811 A | 3/2005 |
| JP | 2005522153 T | 7/2005 |
| JP | 2005526331 T | 9/2005 |
| WO | WO9222983 | 12/1992 |
| WO | WO0197520 | 12/2001 |
| WO | 02059785 A1 | 8/2002 |
| WO | 03085984 A1 | 10/2003 |
| WO | 03098932 A | 11/2003 |
| WO | WO2004/049692 | 6/2004 |
| WO | WO2004/052010 | 6/2004 |

OTHER PUBLICATIONS

Jay Schiller, "Network PVR: Everything on Demand", nCube Corporation, http://www.ncube.com/pressroom/downloads/nvpr-whitepaper.pdf.

Griwodz, "Protecting VoD the Easier Way", Sep. 12, 1998, Multimedia '98 Proceedings of the sixth ACM international conference on Multimedia, vol. 6, pp. 21-28.

* cited by examiner

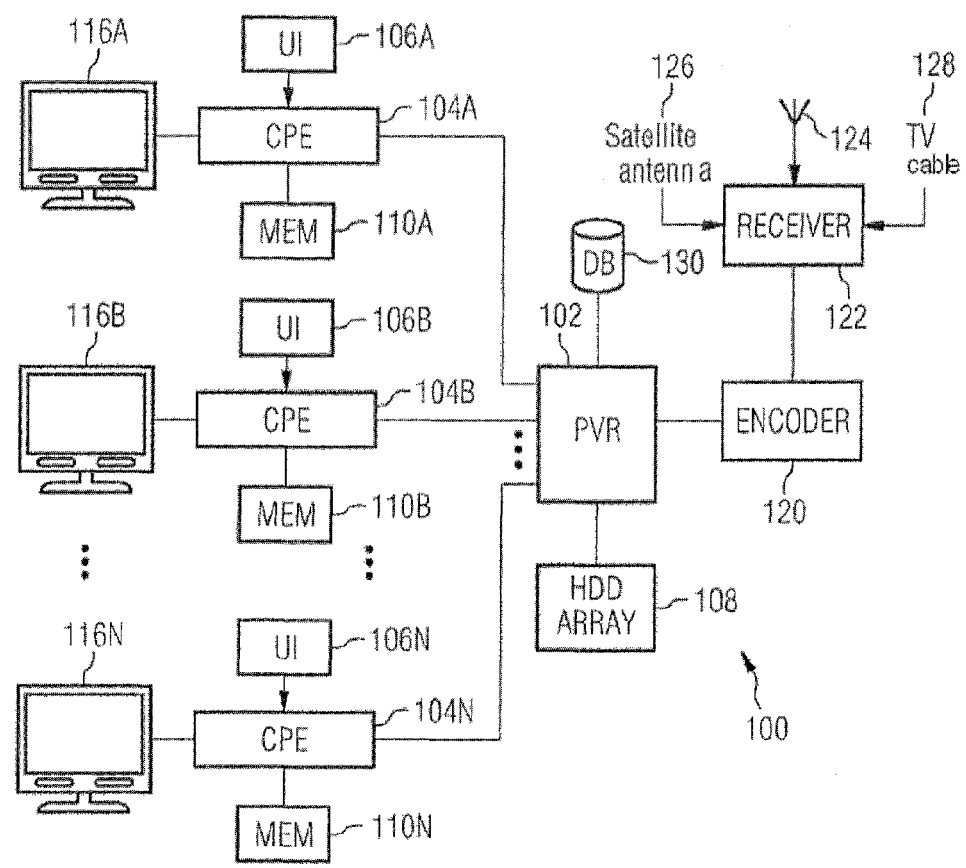

METHOD AND ARRANGEMENT FOR STORING AND PLAYING BACK TV PROGRAMS

CLAIM FOR PRIORITY

This application is a national stage application of PCT/EP2006/061080, filed Mar. 28, 2006, which claims the benefit of priority to U.S. provisional application 60/666,392, filed Mar. 30, 2005, the contents of which are hereby incorporated in their entirety.

TECHNICAL FIELD OF THE INVENTION

The present invention relates to a method and an arrangement for the storage and playback of TV programs. In particular, the present invention provides an improved method and an improved arrangement for operating a PVR, in particular a network PVR.

BACKGROUND OF THE INVENTION

After decades of tape-based analog video recorders being the only means whereby home users could record and conveniently store programs screened on antenna, cable or satellite TV, with the availability of fast and at the same time inexpensive video processors and high-performance video codecs such as, say, MPEG2 (1994) and MPEG4 (1998) a number of mainly hard-disk-based digital machines providing not only straight video recording but also a number of convenience features have become available in recent years.

The term personal video recorder (PVR), or sometimes digital video recorder (DVR), is frequently used for this new generation of devices. While these modern machines can of course be used like conventional VCRs for simple recording and subsequent playback of programs, they are capable of much more than that. For example, a frequently used feature of a PVR is what is referred to as time shifting, whereby the user can begin replaying a program even while it is still recording. Thanks to the high-performance hardware of a modern PVR, the picture quality achieved is superior to that of a conventional VHS or S-VHS tape machine.

Time-shifted viewing also allows the user to "pause" a program initially being viewed live, e.g. to take a telephone call, and to resume playback later, it appearing to the user that he has actually paused the live screening and continued it later. In the background, however, pressing of the "Pause" button by the user has caused the user's PVR to record the current program, and pressing the "Pause" button again results, on the one hand, in the recorded program continuing to be recorded and, on the other, allows it to played back already.

Another very popular feature of a PVR is the ability to skip lengthy sections in a recording with minimal delay. Often this is used during playback to skip blocks of commercials contained in the recorded program. A number of services have become established around this capability which facilitate locating the boundaries of the blocks of commercials, e.g. by storing the start and end of a block as points in time relative to the beginning of a program as a recording index, thereby enabling the commercials to be automatically skipped during playback.

In addition to specially adapted entertainment electronics, multimedia PCs with suitable software are also increasingly being used as PVRs (known as home theater PCs, HTPCs). Technically there is virtually no difference between a specialized PVR and a PC PVR; both have a large (disk) memory, sufficient processor power and suitable video codecs.

By means of configurable software or firmware, both platforms are able to offer the user additional functions, such as program search, thematically geared to his favorite programs. The common feature of both platform variants is that recording takes place locally on the user's premises and the quantity of recordable programs is limited by the local disk memory. It is therefore often possible to transfer recorded programs from the device's internal memory to writable media such as re(writable) CDs or DVDs. However, this involves a cost factor and, not least, the price of a PVR is also considerable. And even PVRs suffer from the problem that recording several programs simultaneously also requires a plurality of PVRs. More expensive multi-tuner machines solve this problem only to a limited extent, as there will always be fewer tuners than TV stations and, in addition, PVR hardware that is of sufficiently high performance for one channel reveals its limitations when required to record a plurality of channels simultaneously.

To be able to offer users all the advantages of a PVR without them having to invest in a PVR, the White Paper "Network PVR: Everything on Demand", Jay Schiller, nCube Corporation, proposes a network PVR whereby storage, encoding logic and codecs are held available in the cable network by a provider. The user gets a unit with which he can select programs to be stored and can retrieve stored programs which are then transmitted to the user in real time by means of a broadband connection. Such a device can be much less powerful than a PVR or an HTPC. At the same time the user can rent virtually unlimited storage space on the PVR server, while the operator of the PVR server only needs to keep one copy of each program which is then distributed as required to those users who have stored that program in their (virtual) store.

In a development, a network PVR of this kind can be designed so as to eliminate "programming" of the network PVR by the user, instead of which the user has access to all the shows in its program list of, for example, the last 4 weeks.

The aforementioned functions of time-shifting and fast skipping of advertising content are frequently manually combined by PVR users, whereby users record a live program, start viewing said program later in time-shift mode and progressively approach the live transmission by skipping the broadcast advertising content. Both in the case of standalone PVRs and in the case of network PVRs, a user must manually estimate how much time is used within the screening of a program for advertising content in order to be able to determine the optimal starting time for the time-shifted playback of this recording. If he starts the playback too early, his program will be interrupted by commercials at any rate toward the end. If he starts too late, although he can enjoy a commercial-free program, he was obliged to wait longer than necessary.

SUMMARY OF THE INVENTION

The invention discloses a method and an arrangement for storing and playing back TV programs which enable the automatic locating of the optimal start time for the time-shifted playback of recorded TV programs.

In one embodiment, there is an arrangement for storing and playing back TV programs which includes the following:
    a device for selecting a TV program that is to be recorded;
    a device for recording the TV program;
    a device for time-shifted playback of a running recording of the TV program that is to be recorded;

a device for determining the time of the start of the screening of the TV program that is to be recorded;

a device for determining the total duration of the advertising content inserted within the TV program during the screening;

a device for determining a time for the earliest start of a commercial-free playback from the time of the start of the screening and the total duration of the inserted advertising content; and a device for displaying the time for the earliest start of a commercial-free playback.

The invention further relates to a method for storing and playing back TV programs, including:

selecting a TV program that is to be recorded;

recording said TV program, wherein a running recording can be played back in time-shift mode;

determining the time of the start of the screening of the TV program that is to be recorded;

automatically determining the total duration of the advertising content inserted within the TV program during the screening;

determining a time for the earliest start of a commercial-free playback from the time of the start of the screening and the total duration of the inserted advertising content; and displaying the time for the earliest start of a commercial-free playback.

According to the invention, the optimal start time (corresponds to the time for the earliest possible start of a commercial-free playback) for the commercial-free playback of a TV program recorded by means of time shifting is advantageously determined and displayed to a user of the arrangement according to the invention. In one embodiment, the start time is displayed in the electronic program guide (EPG) instead of the start time of the screening of the program usually displayed therein or in conjunction with said start time.

The optimal start time can be determined by firstly discovering the time of the start of the screening of the TV program that is to be recorded. The time can be determined, for example, by evaluation of user inputs relating to a program that is to be recorded or by evaluation of electronically available program information, that of the EPG for example. The total duration of the advertising interruptions scheduled for said screening can be determined for example by:

totaling the maximum advertising times over the duration of the screening specified by statutory authorities or by other regulators, e.g. a voluntary self-policing by the television institutions;

a user specifying for each channel manually the maximum length of advertising interruptions per unit of time, if necessary staggered according to the program start hour; or evaluating information available in electronic directories relating to the duration of the screening and duration of the actual content.

The abovementioned information relating to the advertising times can be stored in one or more tables. The tables can, if necessary, be organized in such a way that entries are present for each TV channel separately, for example for the number of advertising minutes per hour as a function of the time of day.

The present invention can be used in connection with standalone PVR solutions, e.g. a conventional PVR or an HTPC.

In these cases the arrangement according to the invention preferably forms the standalone machine, i.e. the PVR or HTPC for example. Alternatively the present invention can also be advantageously used in connection with a network PVR with distributed architecture comprising a PVR server and one or more user terminals.

BRIEF DESCRIPTION OF THE DRAWINGS

Preferred exemplary embodiments of the present invention are explained in greater detail below with reference to a drawing.

FIG. 1 illustrates an arrangement of a network or server and user terminals in connection with the invention.

DETAILED DESCRIPTION OF THE INVENTION

FIG. 1 shows an arrangement 100 comprising a network PVR or PVR server 102 and user terminals 104A . . . 104N supplied by same. The PVR server 102 receives digitally encoded TV channels from an encoder 120. The encoder in turn receives the TV channels from a receiver 122 which receives suitable TV signals via terrestrial antenna 124 and/or satellite antenna 126 and/or TV cable 128. In this arrangement the encoder 120 and the receiver 122 can be designed as a single unit. The encoder 120 uses a codec such as MPEG2 or MPEG4 or codecs derived therefrom to convert the TV signals initially present in analog form into an efficient digital data format. If a TV channel is already present as a digital data stream, e.g. as digital video broadcast DVB, (received terrestrially as DVB-T, via cable as DVB-C or via satellite as DVB-S), the encoder 120 can forward this data stream unmodified to the PVR server 102 or modify it prior to forwarding, e.g. by adapting the bandwidth of the data stream to the bandwidth of the connection to the user terminals 104.

The PVR server 102 is linked to a mass storage device 108 such as a hard disk drive array or HDD array. Numerous methods of creating redundant hard disk mass storage arrays which can still deliver the stored data in full in the event of failure of individual hard disks are well known in the technology. The use of such a redundant array, e.g. a redundant array of independent disks (RAID), is advantageous in relation to the present invention, since a PVR server 102 and the attached mass storage device 108 stores all or at least a large portion of the data of the TV recordings of a large number of users.

The user terminals 104 are connected to the PVR server 102 via the TV cable network or via a DSL link, for example. Modern codecs permit an acceptable video quality and transmission rates of a few hundred kbit/s or more. With the bandwidths of several Mbit/s technically possible via DSL links, two or more parallel video streams (for different playback devices in the user's household) or a single higher-quality video stream are conceivable.

The user terminals 104 can be equipped with or linked to local memory 110 which is implemented for example as a conventional hard disk and/or as flash memory and/or as RAM. Special forms such as micro hard drives available in flash memory card format are of course also conceivable, flash memory having the advantage that data can be stored independently of the presence of a supply voltage while at the same time enabling particularly quiet user terminals 104 to be created, as flash memory has no rotating or other mechanical parts.

In such an arrangement the memory 110 can be permanently connected to the user terminal 104 or be embodied as a replaceable medium. The memory 110 of the user terminals 104 is subject to less stringent requirements than the mass storage device 108 in terms of redundancy and failsafe operation. The user terminal memory 110 can be used to store user preferences and other settings in so far as these are not administered centrally by the PVR server 102.

The user terminal or CPE 104 can be a set-top box which is connected to a video playback device 116. Alternatively, the user terminal 104 can be incorporated in the video playback device 116. The video playback device 116 can be a conventional TV. Alternatively, it can be a monitor which does not have a TV tuner of its own. The user terminal 104 has a user interface 106 allowing the user to manage his archive of recorded TV programs, possibly his personal TV listing and other personal settings. This user interface can, as is usual in the set-top box field, be implemented such that the user makes inputs via a remote control and outputs are displayed to him on the video playback device 116.

A user's inputs relating to the recording of TV programs are sent to the PVR server 102 which generates data records identifying the TV program(s) to be recorded from the data received. The corresponding TV program is earmarked for recording by means of a scheduler. A database 130, e.g. a user database, manages the programs earmarked by a user for recording and checks the user's authorizations, e.g. whether the user has subscribed to the corresponding TV channel.

When a TV program is transmitted, the PVR server 102 checks in conjunction with the database 130 whether a user (one suffices) has earmarked that program for recording. If this is the case, recording is performed, the data arising from the recording being able to be stored completely in the storage array 108 of the PVR server or subdivided into a local and a central part and stored accordingly in the memory 110 of the user terminal 104 or in the mass storage device 108. If the program has been programmed for recording on a plurality of user terminals 104, either a common copy can be provided, all or the central portion of which is stored in the storage array 108 of the PVR server 102, or a separate copy is created for each user terminal. For each user terminal which had earmarked the program for recording, address information relating to the common or separate copy, e.g. a filename or other index information, is stored in the first database 130. A user-related entry of this kind can contain further information about the program in the form of metadata such as an expiration date or the positions of any blocks of commercials.

If the recording data is subdivided into central and local data, the local data is accordingly sent to all the user terminals 104 on which the program is to be included in the personal TV listing, the subdivision of the data being implementable in such a way that at least the central data stream, on its own, no longer supplies a decodable video signal (picture and sound). only when the two volumes of data (from the memory 110 of the user terminal 104 and the mass storage device 108) are combined can the program be played back in its entirety.

To initiate playback, a user requests, by means of user interface 106 on the user terminal 104, the archive of available programs which is sent from the database 130 to the user terminal 104 for display by means of the user interface, e.g. on the screen 116. From the archive, the user can select a recording and initiate playback by appropriate input. The user terminal transmits this request to the PVR server 102 which locates the corresponding video data in the mass storage device 108 by means of the database 130 and sends this as a video stream to the corresponding user terminal 104.

If the recording data has been subdivided into central and local data, the parts of the recording stored in the memory 110 of the selecting user terminal 104 and in the mass storage device 108 can be combined in the PVR server 102. For this purpose the data stored in the user terminal is first transmitted to the PVR server and combined there. The completed video data is then transmitted to the user terminal 104 for playback as a real-time data stream.

Alternatively, the parts of the recording stored in the memory 110 of the selecting user terminal 104 and in the mass storage device 108 can be combined in real time in the user terminal 104. In response to appropriate user input, by means of the PVR server 102 the incomplete video data is transmitted as a near-real-time data stream from the mass storage device 108 to the user terminal 104 where it is supplemented by the data stored in the user terminal 104 and played back. Near-real-time data stream, in this context, means that, depending on the selected subdivision of data between local memory 110 and mass storage device 108, comparatively large volumes of data can also be present in the local memory, e.g. intro sequences which are played back first before the possibly hitherto buffered data from the mass storage 108 is prepared for playback.

In one exemplary embodiment, information concerning which TV channel uses how much transmission time within a screening for advertising at which time of day is present in the PVR server 102 or in the database 130 or at another storage location to which the PVR server 102 has access. This information can be derived for example from statutory guidelines or specifications of other regulators. Alternatively, an operator of the PVR server 102 can have advertising times occurring determined empirically by its users as a function of the time of day and use for example the average value or the maximum value of these empirically determined times for calculating the duration of the advertising content during a screening.

In a further exemplary embodiment data is made available to the PVR server 102 for retrieval, for example via the internet, relating to the duration of the screening and the duration of the content transmitted during said screening. In particular in the case of feature films, there are often details in electronic program magazines, EPGs or even in the videotext concerning the length of the actual film. The duration of the broadcast can be determined from the start and end times of the screening, and finally the duration of the embedded advertising content can be determined from the difference between the duration of the broadcast and the length of the film.

In both embodiments the calculated duration of the advertising content can be used to determine the time for the earliest start of a commercial-free playback. This time can be displayed to the user for example via the user interface 106, while the user is programming the corresponding TV program for recording. Said time can be displayed here in addition to or instead of the time at which the screening begins.

Advantageously, the user now has the opportunity to use the time-shift capability to start the playback at the calculated time for the earliest start of a commercial-free playback and skip inserted advertising content.

In this arrangement the skipping of advertising content can be effected by means of a special button on the remote control.

For example, one of the following sequences can be initiated by means of said button:

The PVR server 102 is caused to determine the end of the current block of commercials on the basis of the metadata stored in relation to the played-back TV program and to continue the playback from this time marker. OR The PVR server 102 is caused to skip forward by a specific length of time, e.g. half a minute, in the playback. Said length of time can be based on the typical length of an advertising spot. The user can quickly reach the end of a block of commercials by repeated actuation of the button.

If it is not possible for legal reasons, say on account of a lack of agreement on the part of the operators of the TV channels, to determine the information concerning the time for the earliest start of a commercial-free playback centrally by the PVR server and to include said information in the EPG, said information can, in a further embodiment, also be determined in an analogous manner in the user terminal 104. For this purpose a separate internet connection of the user terminal 104 (not shown) may be required. The skipping of the advertising content is then effected as described hereintofore, in which case the metadata is also stored in the user terminal 104 if necessary and actuating the aforesaid button results in the user terminal 104 requesting the PVR server 102 to continue the playback at the end of a block of commercials determined on the basis of the local metadata.

It can be provided to levy a special fee from users who use the service of the operator of the PVR server 102 in accordance with the present invention, said special fee consisting for example of an additional fee to be paid monthly or a usage-dependent charge.

While the invention has been described in the foregoing with reference to the FIGURE for a network PVR, it is of course also possible, as mentioned earlier, to use the present invention in conjunction with conventional PVR or HTPC solutions (not shown). The use of the methods described in connection with network PVRs for determining the time for the earliest start of a commercial-free playback is also possible without difficulty for standalone solutions, based on the foregoing detailed description.

An electronic program guide (EPG) or software which collects program information from different internet offerings or other sources is often the basis for the use of a PVR or HTPC. This information is available to a user for programming a TV program for recording. With certain user terminals available on the market, the user must specify in this case where applicable that he intends not only to record the program, but also to play back said recording in time-shift mode.

What is claimed is:

1. A system, comprising:
   a selecting device adapted for selecting a TV program that is to be recorded;
   a recording device adapted for recording the TV program;
   a playback device adapted for time-shifted playback of a running recording of the TV program that is to be recorded;
   a PVR server adapted for:
      determining a time of a start of a screening of the TV program that is to be recorded;
   determining a total duration of advertising content inserted within the TV program during the screening;
   determining a time of day for an earliest start of a commercial-free playback from the time of the start of the screening and the total duration of the inserted advertising content; and
   a time displaying device adapted for displaying the time of day for the earliest start of the commercial-free playback.

2. The system as claimed in claim 1, wherein:
   the selecting device includes a user interface and an electronic program guide, the time displaying device configured such that a time included in the electronic program guide for the start of the screening of the TV program that is to be recorded is replaced or supplemented by the determined time of day for the earliest start of the commercial-free playback of the TV program.

3. The system according to claim 1, wherein:
   the PVR server comprises at least one table, information concerning how much advertising content per unit of time will be transmitted being stored in the table for each TV channel, and the total duration of the advertising content inserted within the TV program during the screening being determined in that a channel screening the TV program is determined and advertising content per unit of time is totaled over a screening duration of the TV program.

4. The system as claimed in claim 3, wherein:
   for each TV channel the table includes statutory guidelines for each hour of a day relating to a maximum number of advertising minutes that are allowed per hour.

5. The system as claimed in claim 1, wherein:
   the PVR server is adapted for:
      determining a duration of the screening of the TV program;
      determining a nominal duration of the screened content; and
      determining the total duration of the inserted advertising content as the difference between the duration of the screening and the duration of the screened content.

6. The system as claimed in claim 1, wherein:
   the recording and playback devices are configured in the form of:
      the PVR server having a receiving device for receiving a plurality of digitally encoded TV channels,
      a supply device adapted for supplying a plurality of user terminals, and
      a storing device adapted for recording TV programs to be stored, and further comprising at least one user terminal having a selecting device adapted for selecting TV programs to be stored, a transmitting device adapted for transmitting the selection to the PVR server and a playing device adapted for playing back TV programs recorded by the PVR server.

7. A method for storing and playing back TV programs, comprising:
   selecting a TV program that is to be recorded;
   recording the TV program, whereby the recording is configured to be played back as a running recording in time-shift mode;
   determining a time of a start of a screening of the TV program that is to be recorded;
   automatically determining a total duration of advertising content inserted within the TV program during the screening;
   determining a time of day for an earliest start of a commercial-free playback from the time of the start of the screening and the total duration of the inserted advertising content; and
   displaying the time of day for the earliest start of the commercial-free playback.

8. The method as claimed in claim 7, wherein:
   a TV program that is to be recorded is selected by a user interface and an electronic program guide, with a time included in the electronic program guide for the start of the screening of the TV program that is to be recorded being replaced or supplemented by a calculated time of day for the earliest start of the commercial-free playback of said TV program.

9. The method as claimed in claim 7, wherein:
the total duration of the advertising content inserted within the TV program during the screening is determined with reference to at least one table, the table including information for each TV channel concerning how much advertising content per unit of time will be transmitted, and wherein the total duration of the advertising content inserted within the TV program during the screening is calculated in that the channel screening the TV program is determined and advertising content per unit of time is totaled over the duration of the screening of the TV program.

10. The method as claimed in claim 9, wherein:
for each TV channel the table includes statutory guidelines for each hour of a day relating to a maximum number of advertising minutes that are allowed per hour.

11. The method as claimed in claim 7, wherein:
the total duration of the advertising content inserted within the TV program during the screening is determined by:
determining a duration of the screening of the TV program;
determining a nominal duration of the screened content; and
determining the total duration of the inserted advertising content as a difference between the duration of the screening and the nominal duration of the screened content.

12. The method as claimed in claim 7, further comprising:
providing a PVR server having a receiving device adapted for receiving a plurality of digitally encoded TV channels, a supplying device adapted for supplying a plurality of user terminals and a recording device adapted for recording TV programs that are to be stored, and at least one user terminal having a selecting device adapted for selecting TV programs that are to be stored, a transmitting device adapted for transmitting the selection to the PVR server and a playback device adapted for playing back TV programs recorded by the PVR server.

* * * * *